(12) United States Patent
Czarnecky et al.

(10) Patent No.: US 10,420,325 B2
(45) Date of Patent: Sep. 24, 2019

(54) GPS TRACKING INSERT FOR A PET COLLAR OR SIMILAR BUCKLED DEVICE

(71) Applicant: Pinpoint Ideas, LLC, Knoxville, TN (US)

(72) Inventors: Joseph Anthony Czarnecky, Okauchee, WI (US); Steven Andrew Rook, Cary, IL (US); Scott Allen Crutchfield, Louisville, TN (US); Gregory Parker Stair, Knoxville, TN (US)

(73) Assignee: Pinpoint Ideas, LLC, Knoxville, TN (US)

( * ) Notice: Subject to any disclaimer, the term of this patent is extended or adjusted under 35 U.S.C. 154(b) by 58 days.

(21) Appl. No.: 15/793,589

(22) Filed: Oct. 25, 2017

(65) Prior Publication Data

US 2018/0110205 A1    Apr. 26, 2018

Related U.S. Application Data

(60) Provisional application No. 62/413,348, filed on Oct. 26, 2016.

(51) Int. Cl.
*A01K 15/02* (2006.01)
*A01K 27/00* (2006.01)
(Continued)

(52) U.S. Cl.
CPC .......... *A01K 15/021* (2013.01); *A01K 27/009* (2013.01); *G01S 5/0027* (2013.01);
(Continued)

(58) Field of Classification Search
CPC combination set(s) only.
See application file for complete search history.

(56) References Cited

U.S. PATENT DOCUMENTS

| 4,426,957 A | 1/1984 | Horrigan |
| 5,603,094 A | 2/1997 | Greear |

(Continued)

FOREIGN PATENT DOCUMENTS

| CA | 2774382 | 1/2016 |
| CN | 106357974 | 1/2017 |

(Continued)

OTHER PUBLICATIONS

Patent Cooperation Treaty, International Search Report, Form PCT/ISA/220, dated Jan. 11, 2018.

*Primary Examiner* — Travis R Hunnings
(74) *Attorney, Agent, or Firm* — Pitts & Lake, P.C.

(57) ABSTRACT

A tracking insert adapted, in an exemplary embodiment, to be inserted into and received by the collar connector of a state-of-the-art pet collar, such that the tracking insert becomes an extension of the pet collar is provided. The tracking insert comprises a linear band housing a linear array of electronic modules in electronic communication with one another. For instance, the modules include, in an exemplary embodiment, a GPS radio receiver, one or more modules adapted to communicate with a mobile device by known protocols such as Wi-Fi, Bluetooth, or mobile communication protocols in a manner readily understood and implementable by those skilled in the art, and other modules such as a light, a camera and/or a communication module to allow the owner to communicate with the pet.

16 Claims, 7 Drawing Sheets

(51) Int. Cl.
  *G01S 5/00* (2006.01)
  *G01S 19/14* (2010.01)
  *A01K 11/00* (2006.01)
  *G01S 19/42* (2010.01)
(52) U.S. Cl.
  CPC ............ *G01S 19/14* (2013.01); *A01K 11/008* (2013.01); *G01S 19/42* (2013.01)

(56) References Cited

U.S. PATENT DOCUMENTS

| | | | |
|---|---|---|---|
| 5,865,148 A | 2/1999 | Aguirre | |
| 5,900,818 A | 5/1999 | Lemnell | |
| 6,067,018 A | 5/2000 | Skelton | |
| 6,283,065 B1 | 9/2001 | Shorrock | |
| 6,899,060 B1 | 5/2005 | Yen | |
| 6,970,090 B1 | 11/2005 | Sciarra | |
| 8,468,979 B2 | 6/2013 | Mottram | |
| 8,615,252 B2 | 12/2013 | Spire | |
| 8,736,499 B2 | 5/2014 | Goetzl | |
| 8,783,212 B2 | 7/2014 | Bellon | |
| 9,693,536 B1 | 7/2017 | Dana | |
| 9,734,477 B2 | 8/2017 | Weast | |
| 9,861,080 B1 * | 1/2018 | Hathway | A01K 27/009 |
| 2008/0061990 A1 * | 3/2008 | Milnes | A01K 15/023 340/573.1 |
| 2009/0038670 A1 | 2/2009 | Shu | |
| 2010/0288208 A1 | 11/2010 | Mottram | |
| 2013/0233252 A1 | 9/2013 | Bellon | |
| 2016/0135431 A1 | 5/2016 | Siegel | |
| 2016/0242393 A1 | 8/2016 | Kennedy | |
| 2017/0086425 A1 | 3/2017 | Bianchi | |
| 2017/0095206 A1 | 4/2017 | Leib | |
| 2017/0181407 A1 | 6/2017 | Bonge | |

FOREIGN PATENT DOCUMENTS

| | | |
|---|---|---|
| CN | 106455520 | 2/2017 |
| GB | 2449930 | 12/2008 |
| GB | 2531411 | 4/2016 |
| WO | WO2007/103301 | 9/2007 |
| WO | WO2008/104810 | 9/2008 |
| WO | WO2010/059067 | 5/2010 |
| WO | WO2016/077816 | 5/2016 |

* cited by examiner

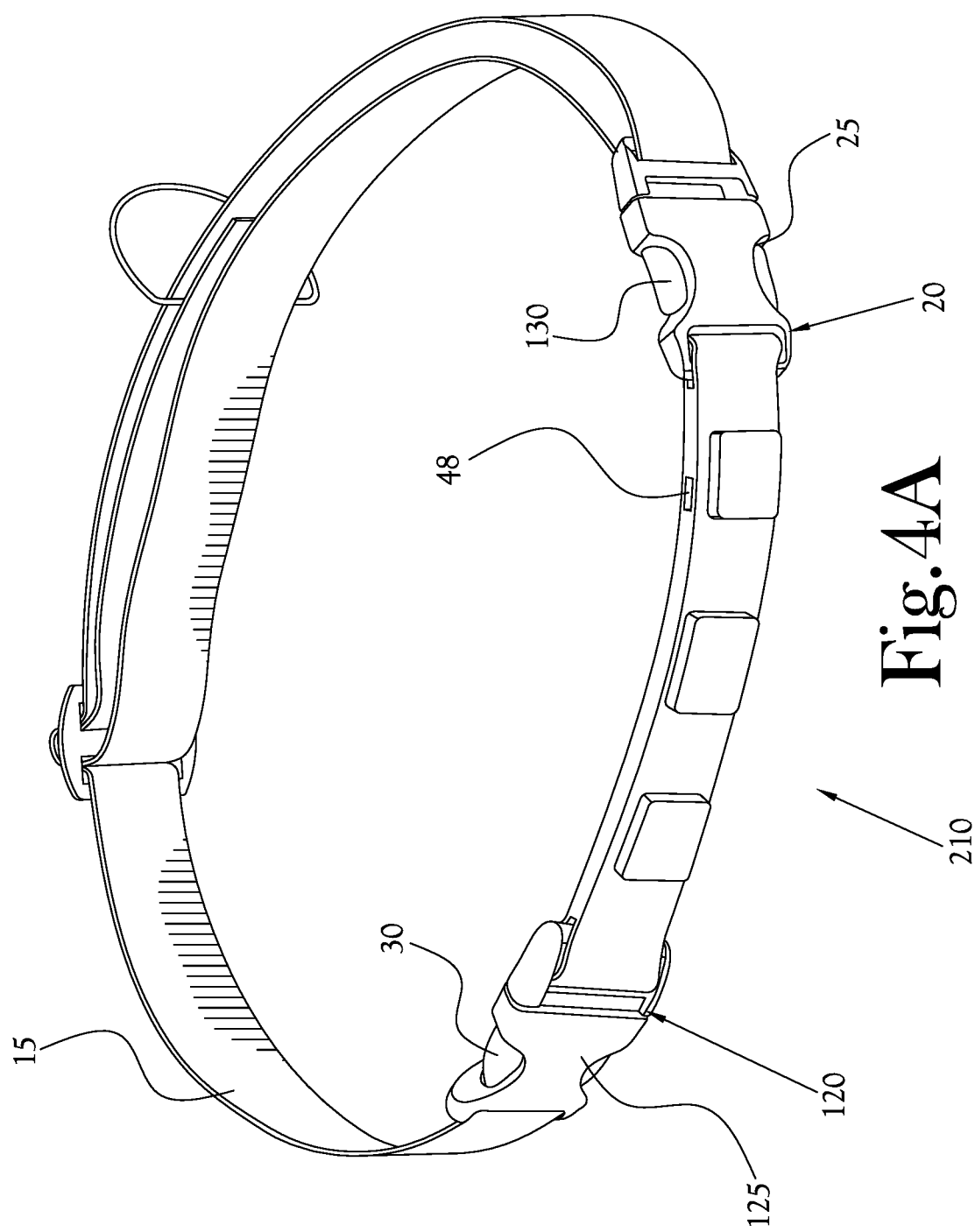

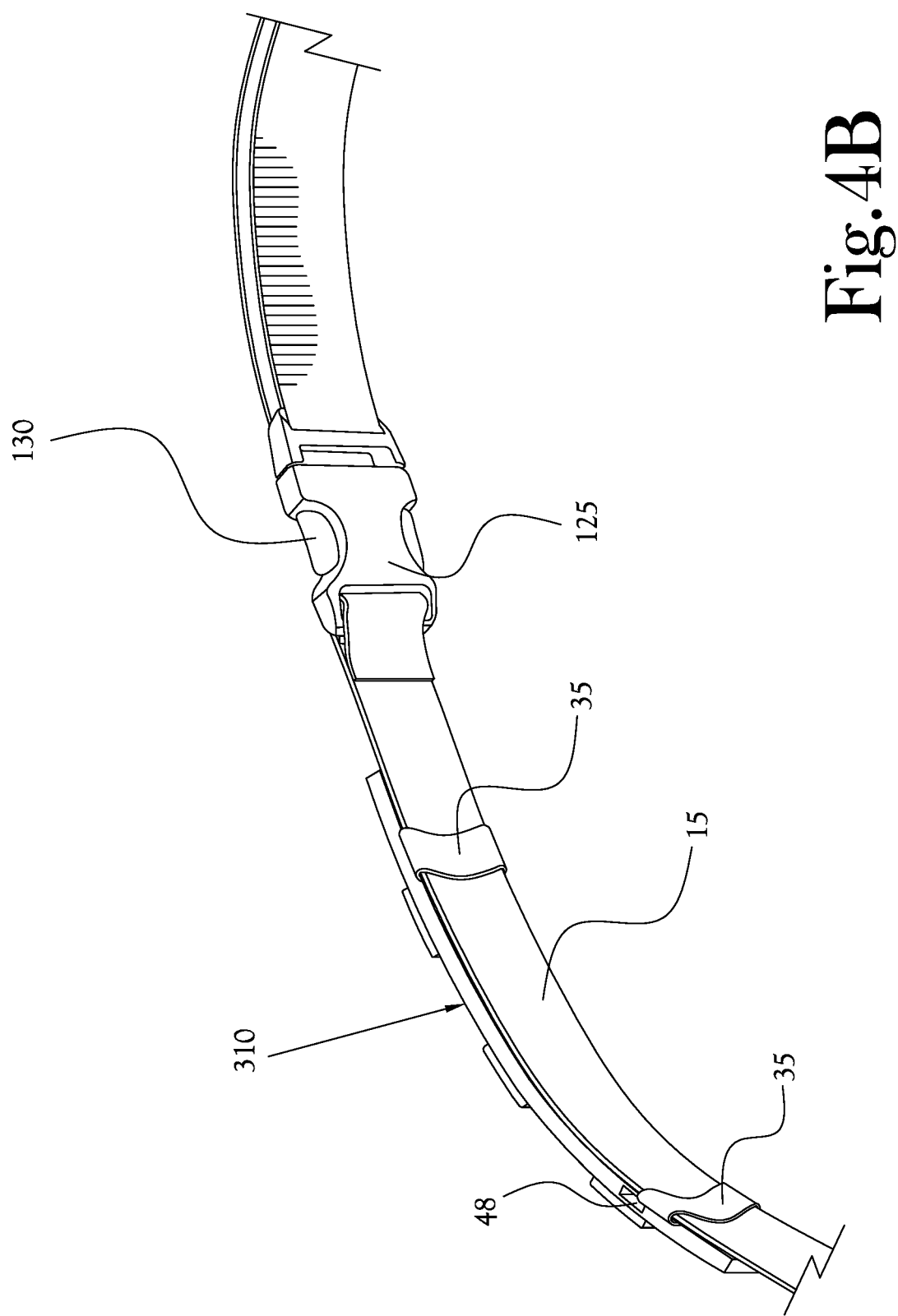

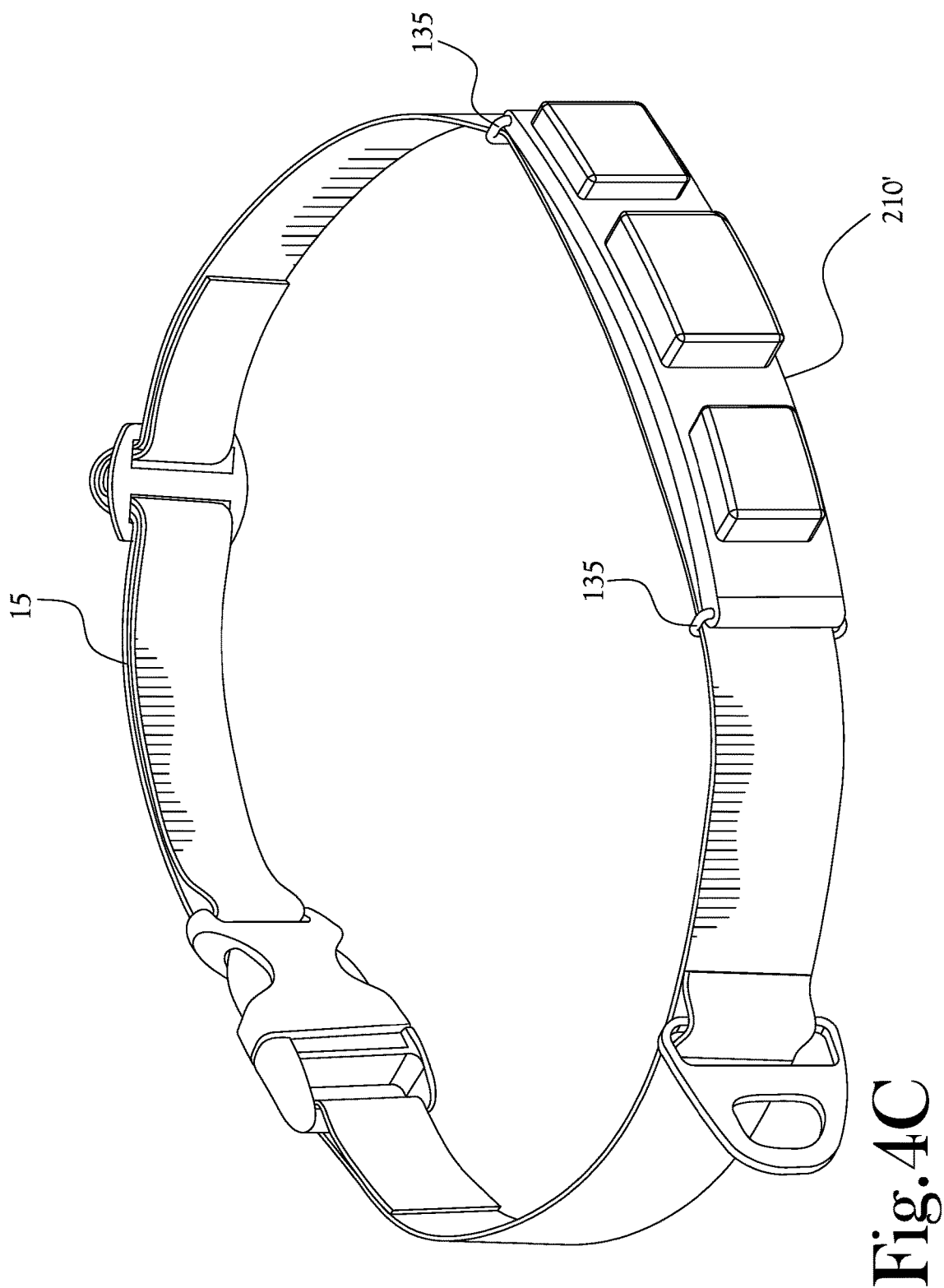

US 10,420,325 B2

GPS TRACKING INSERT FOR A PET COLLAR OR SIMILAR BUCKLED DEVICE

CROSS-REFERENCE TO RELATED APPLICATIONS

This application claims the benefit of U.S. Provisional Patent Application No. 62/413,348, filed on Oct. 26, 2016, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to a GPS tracking insert. More particularly, it relates to a GPS tracking insert having a plurality of interconnected modules housing the power supply and various electronic components and in which the tracking insert is adapted to be received by a pet collar or similar buckled device.

2. Description of the Related Art

In the field of utilizing satellite technology and triangulation to determine the location of an item, asset, animal, person, or vehicle, commonly referred to as the Global Positioning System, or "GPS", in the USA, it is well known to use GPS and/or radio signal tracking, to determine the location of pets, in general, and sport dogs, in particular. For instance, wearable GPS tracking devices are utilized to track and monitor the location of sport dogs in the field and are also used by athletes to monitor and track pace, speed, and distance traveled while running, swimming, biking, and trekking. It is also known in the art to utilize GPS trackers to monitor the location of children, especially special needs children.

What is missing from the art is a GPS tracking device adapted to be received by various articles, including, without limitation, a state-of-the-art animal collar.

BRIEF SUMMARY OF THE INVENTION

A tracking insert adapted, in an exemplary embodiment, to be inserted into and received by the connector of a state-of-the-art pet collar, such that the tracking insert becomes an extension of the pet collar is provided. It will be appreciated by those skilled in the art that there are a number of collar connectors for pet collars, including, without limitation, connectors having a frame and prong buckle with a cooperating perforated strap, side release buckles, and the like. The tracking insert comprises a linear band housing a linear array of electronic modules in electronic communication with one another. For instance, the modules include, in an exemplary embodiment, a GPS radio receiver, an accelerometer for detecting activity, modules adapted to communicate with a mobile device by known protocols such as Wi-Fi, Bluetooth, or mobile communication protocols, including a SIM card module for facilitating cellular communication, in a manner readily understood and implementable by those skilled in the art. In applications in which the tracking insert is used with a pet, such as a sport dog, and in an exemplary embodiment, the modules can further include a light, such as an LED light, a speaker and microphone combination, preferably capable of full duplex communication, for allowing the user to communicate with the pet. These various modules are in electronic communication with one another via a plurality of electrical leads. Further, in an exemplary embodiment, the various modules are secured to one another in a linear array by means of reinforcing members such as support cables or a wire mesh in order to provide for strength to hold the modules and their respective electrical leads in place and assist in preventing tearing in the event that an animal such as a dog pulls at the tracking insert, or the tracking insert is snagged on an obstacle. Further, in order to protect the linear array of modules and the electrical leads from wear and, in an exemplary embodiment, to provide weather and moisture resistance, an over-molding is provided. Over-molding could be any number of rubber or polymeric materials. In an exemplary embodiment, the tracking insert is covered in rubber to make it water resistant and to resist abrasion from use.

BRIEF DESCRIPTION OF THE SEVERAL VIEWS OF THE DRAWINGS

The above-mentioned features of the invention will become more clearly understood from the following detailed description of the invention read together with the drawings in which:

FIG. 4A is a perspective view of the of the tracking insert, as illustrated in FIG. 3A, secured to a pet collar;

FIG. 4B is a perspective view of a further exemplary embodiment tracking insert adapted to be clipped to a state-of-the-art pet collar;

FIG. 4C is a perspective view of a further exemplary embodiment tracking device illustrating a further exemplary embodiment for securing the tracking device to a state-of-the-art pet collar;

DETAILED DESCRIPTION OF THE INVENTION

Figure 1:
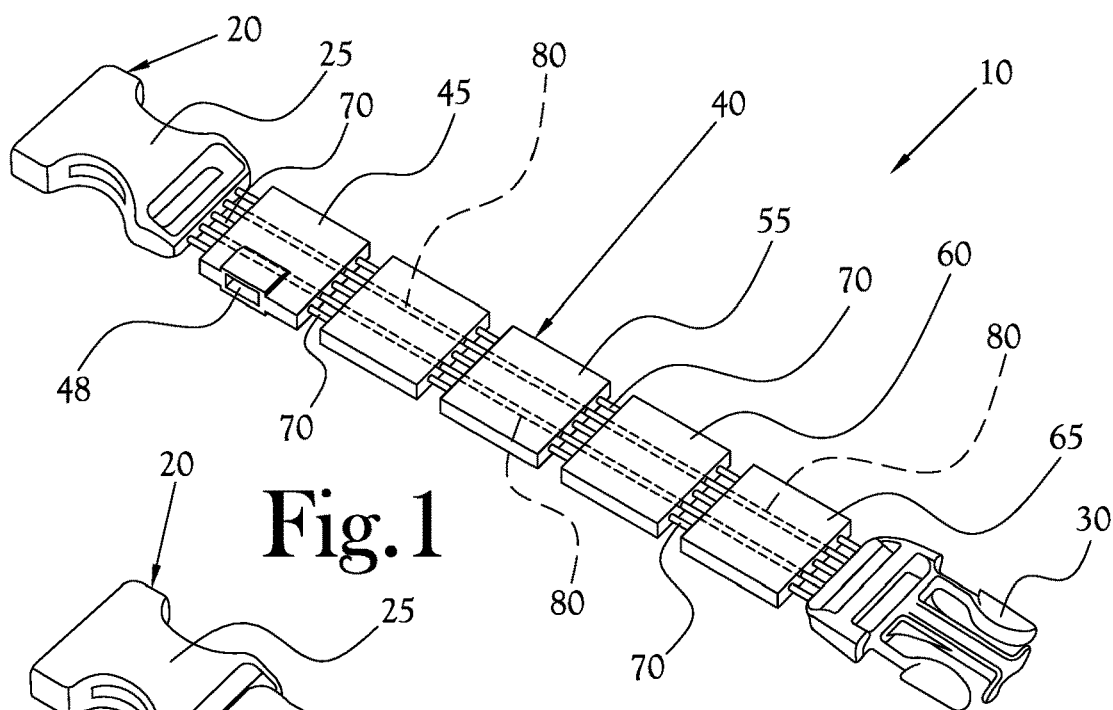
FIG. 1 is a perspective view of the tracking insert of the present invention in which the protective covering has been removed, exposing to view, the interconnected modules.
Figure 2A:
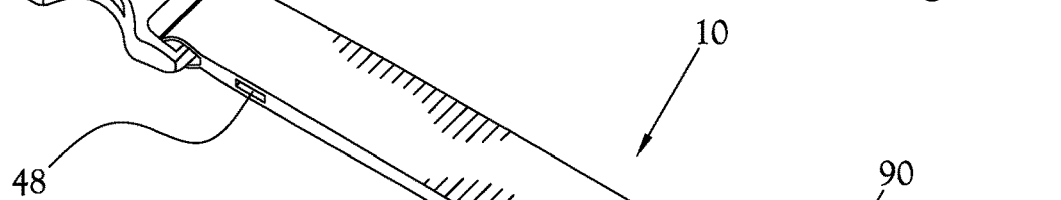
FIG. 2A is a further perspective view of the tracking insert illustrated in FIG. 1 including the protective covering.
Figure 2B:
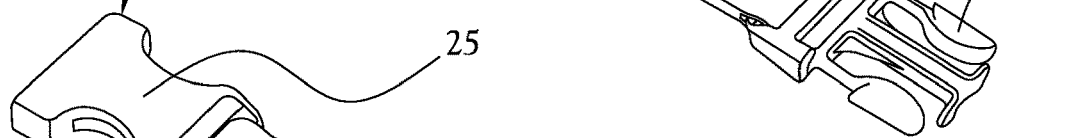
FIG. 2B is a perspective view of a further exemplary embodiment of the tracking insert of the present invention having an alternate charging contact.
Figure 3A:
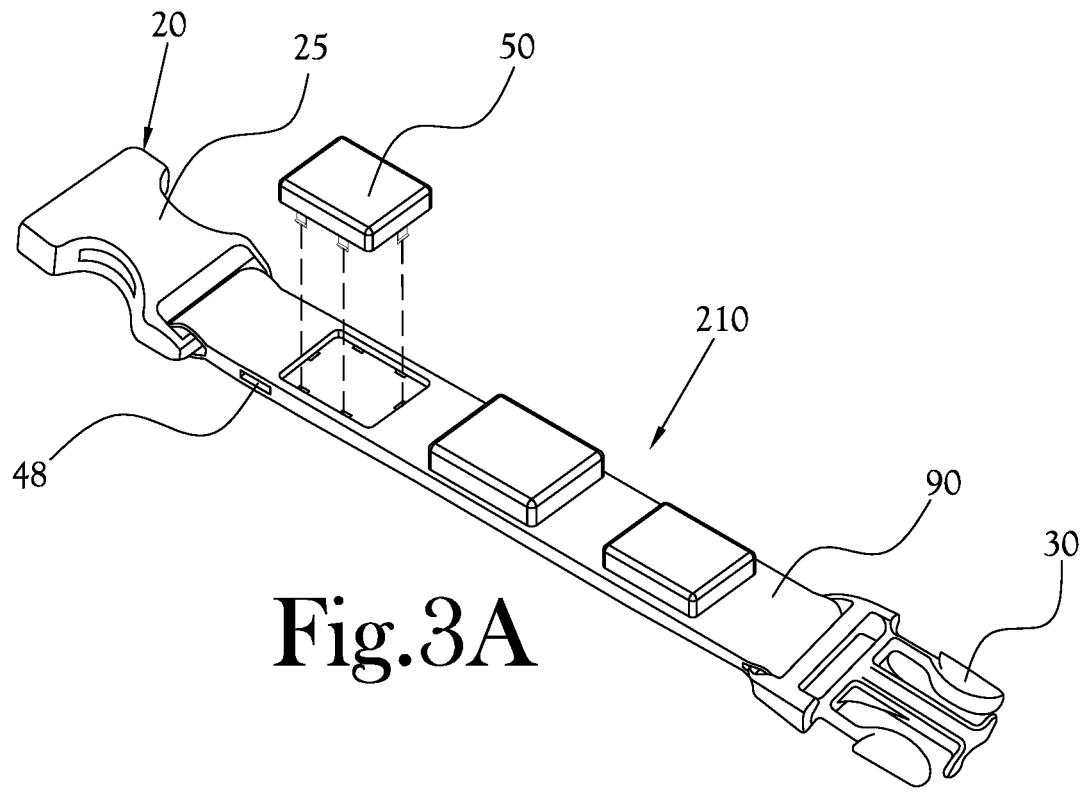
FIG. 3A is a perspective view of a further exemplary embodiment of the tracking insert of the present invention having male and female portions of a side release buckle.
Figure 3B:
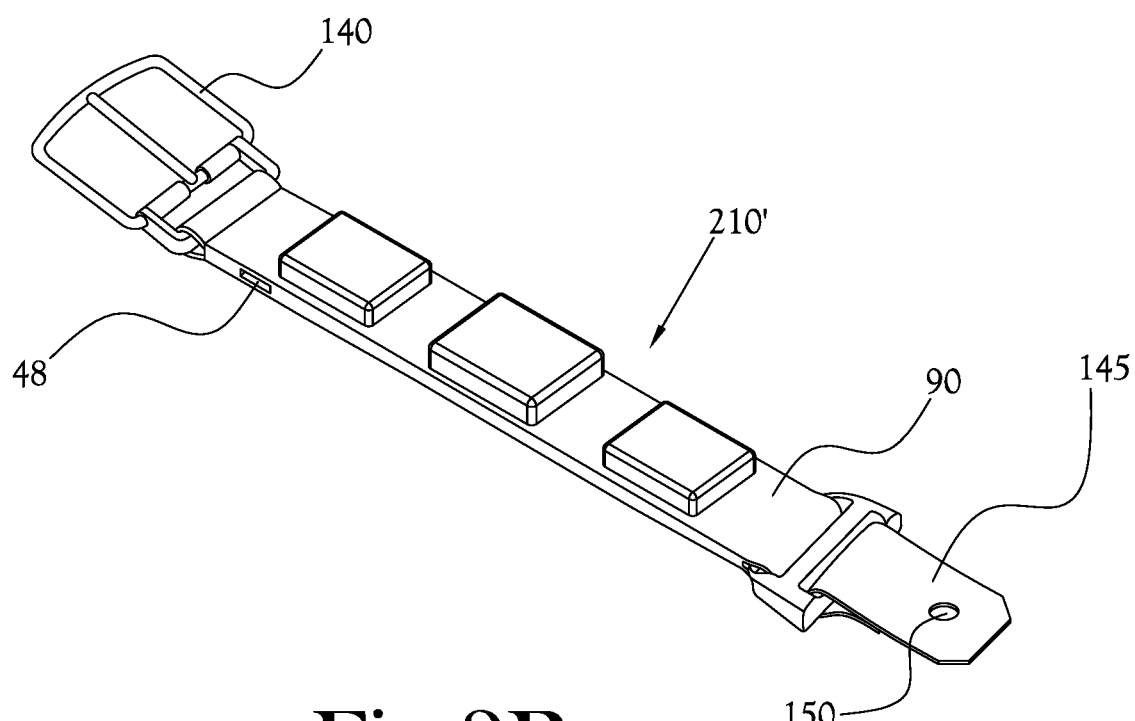
FIG. 3B is a perspective view of a further exemplary embodiment of the tracking insert of the present invention in which the collar connector is defined by a buckle having a frame and prong configuration.

FIGS. 1-6 illustrate a tracking insert 10 adapted to be received by a state of the art pet collar 15. Tracking insert 10 comprises a linear band housing a linear array of electronic modules in electronic communication with one another as will be described in greater detail below. Tracking insert 10, in an exemplary embodiment could use a GPS radio receiver for receiving tracking signals from various GPS transmitters, such as satellites or cell tower transmitters. In this regard, as used herein, "GPS" refers broadly to any satellite based positioning system used for transmitting information that is received by a user's receiver to calculate the user's three-dimensional position and time, including without limitation the Global Positioning System owned by the U.S. and operated by the U.S. Air Force. As used herein "GPS" also broadly refers to other international tracking satellite systems such as the Russian GLONASS system and the European Galileo system and also includes assisted GPS, often referred to as a-GPS, which also utilizes, among other things, mobile phone cell tower signals. Additionally, tracking insert 10 must be able to communicate the location of the tracking insert to a user's device, such as a smart phone (not illustrated), through known protocols such as Wi-Fi, Bluetooth, or mobile communication protocols, including without limitation both United States based, and international cellular communication systems, in a manner readily understood and implementable by those skilled in the art.

Tracking insert 10 further comprises, in an exemplary embodiment, a selectively releasable collar connector 20 having, in an exemplary embodiment, a female portion 25 and a cooperating interlocking male portion 30. The female portion 25 and the male portion 30 are, in an exemplary embodiment, adapted, or configured, to be readily received by a similarly configured male and female portions of a compatible collar connector, such as the illustrated side release buckle commonly found on state-of-the-art pet collars, such as pet collar 15. In this regard, in an exemplary embodiment, pet collar 15 includes a selectively releasable side release buckle 120 having a female portion 125 and a cooperating interlocking male portion 130. The female portion 25 of tracking insert 10 releasably receives and the male portion 130 of pet collar 15, while the female portion 125 of pet collar 15 releasably receives male portion 30 of tracking insert 10 such that tracking insert 10 is received by, and is inserted into, pet collar 15 as best illustrated in FIG. 4A.

It will be appreciated by those skilled in the art that certain traditional pet collars have a collar connector defined by a frame and prong configuration in which the prong is passed through a hole in the distal end, i.e. the flap, of the belt portion of the collar. Accordingly, in a further exemplary embodiment, illustrated in FIGS. 3B and 6, the tracking insert 210' of the present invention could be provided with a frame and prong buckle 140 secured to one end of the tracking insert 210' while the other end of the tracking insert 210' includes a flap member 145 having at least one hole member 150 adapted for receiving the prong 160 of the buckle 165 of the pet collar 15'.

In a further exemplary embodiment, illustrated in FIG. 4B, tracking insert 310 utilizes at least a pair of clip members 35 to removably secure tracking insert 310 to any type of pet collar, such as, for example, pet collar 15. In an exemplary embodiment, illustrated in FIG. 4B, the clips 35 wrap around the top and bottom edge of the collar 15 so as to prevent the tracking insert 310 from inadvertently slipping off of the pet collar 15. It will be appreciated that clip members 35 could be fabricated of a rigid material such as plastic or metal or could be a fabric, such as a Velcro loop. Similarly, as illustrated in 4C, loop members 135 could be disposed at respective ends of tracking insert 310' and adapted to receive collar 15 so as to prevent the tracking insert 310' from inadvertently slipping off of the pet collar 15.

Figure 5:
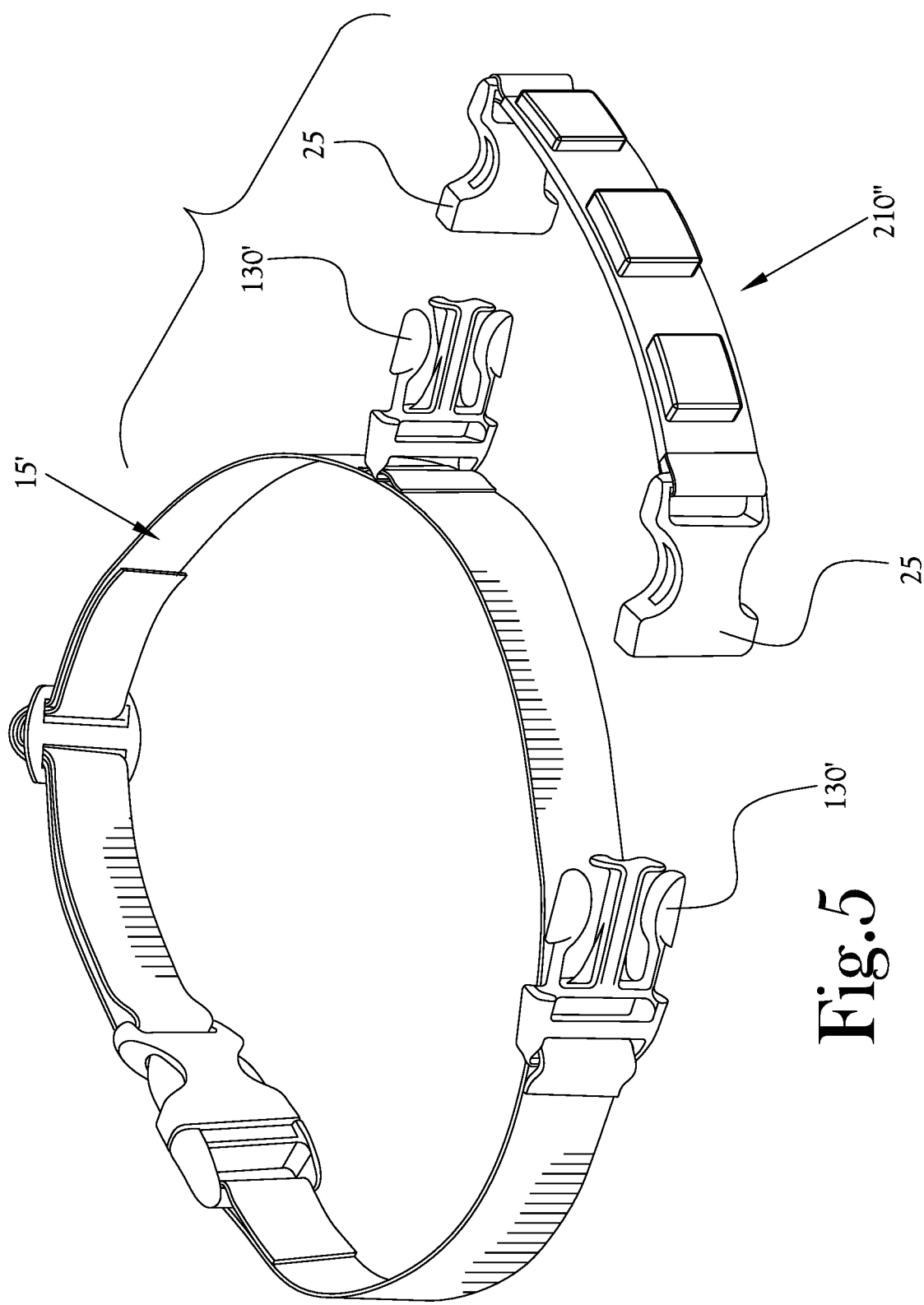
FIG. 5 is a perspective view of a further exemplary embodiment tracking device adapted to be secured to a modified pet collar.
Figure 6:
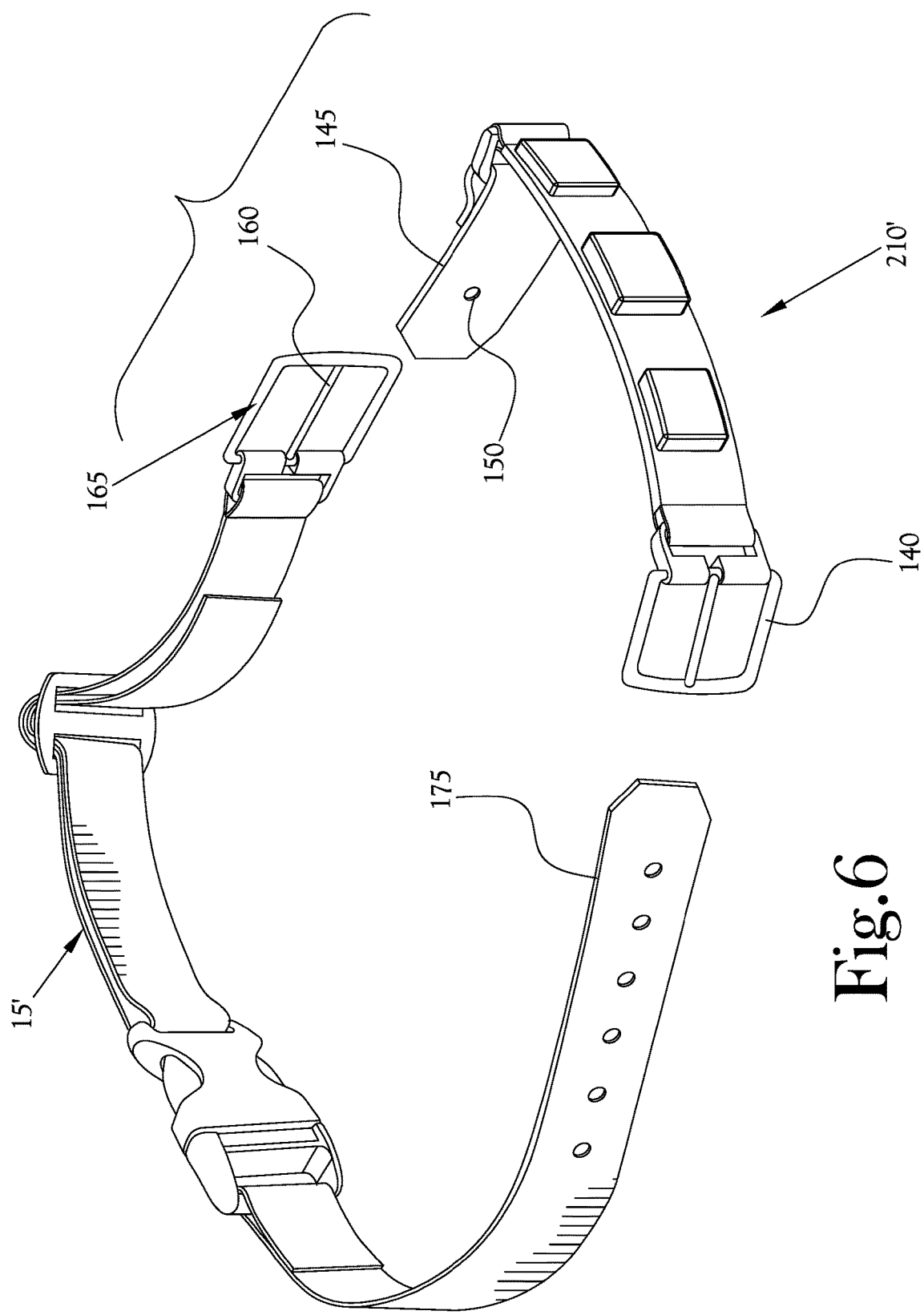
FIG. 6 is a perspective view of the tracking insert, as illustrated in FIG. 3B, secured to a pet collar.

In a further exemplary embodiment, illustrated in FIG. 5, the pet collar 15' is provided with secondary side release buckles 130'. Buckles 25 of tracking insert 210" are connected to the secondary side release buckles 130' in a manner that does not affect the length of the pet collar and without serving as an extension of the pet collar. In this manner, the tracking insert 210" can be attached to and removed from the pet collar 15' without the necessity of removing the pet collar 15' from the animal and without the need to readjust the length of the pet collar 15'. For instance, a sport dog wearing the collar described herein could be taken into the field, the tracking insert 210" secured to the secondary side release buckles 130', and the sport dog then released into the field. At the end of the activity, the tracking insert 210" would be removed from the pet collar 15' without the need for removing the collar itself from the sport dog.

In an exemplary embodiment, the tracking insert could utilize GPS signals for tracking. Disposed between the female portion 25 and the male portion 30 of collar connector 20 is a linear array of modules 40. Modules 40 house the various electronic components making up the tracking insert 10. In this regard, various modules 40 could house a charging port, a power source such as a battery, a GPS receiver, a radio module for radio based tracking devices, and a transceiver for communicating with a mobile device, including without limitation a Wi-Fi radio, Bluetooth radio, or a transceiver for various mobile communication protocols, including without limitation, cell phone protocols. In an exemplary embodiment of the tracking device 10, when intended for use with a pet, a communication module, in conjunction with a transceiver, could be included which includes a speaker and microphone combination, preferably capable of full duplex communication, for allowing the user to communicate with, and listen to the pet. For instance, in an exemplary embodiment, the tracking device 10 could include a charger module 45 having a charging port 48, a battery module 50, a GPS receiving antenna module 55, a radio module 60, and a transceiver module 65. It will be appreciated that use of a-GPS, i.e. by correlating GPS satellite signals and the cellular module to triangulate off of cell towers, more accurate position determinations are possible. Other modules can be provided, including a light, a camera, and a command tone generator.

Additionally, in a further exemplary embodiment, electronic circuitry could be provided to detect any loss of electrical continuity, or loss of electrical power, resulting, for instance, in the tracking insert being snagged on an obstacle or intentional tampering. In the event such a loss in electrical continuity is detected, the tracking insert would send a signal to the monitoring device, so that the person monitoring the GPS signal and location of the tracked animal would know that the device has lost power or that the electrical continuity of the device has been severed or compromised. In this manner, the user is notified if the device is being, or has been, tampered with. Further, in an exemplary embodiment, tampering could be detected by using the accelerometer module to detect a pattern of use and by using a comparative algorithm to detect any tampering-based disruption of this pattern of use.

In an exemplary embodiment, these various modules 40 are in electronic communication with one another via a plurality of electrical leads 70. While three electrical leads 70 are illustrated, it will be appreciated that a plurality of electrical leads 70 would be utilized. The present invention is not intended to be limited merely to the illustrated number of electrical leads 70. Further, in an exemplary embodiment, the various modules 40 are secured to one another in a linear array by means of reinforcing support cables 80 in order to provide for strength to hold the electrical leads 70 in place and assist in preventing tearing in the event that an animal pulls at the tracking insert 10, or the tracking insert 10 is snagged on an obstacle. Moreover, while two support cables 80 are illustrated, it will be appreciated that more or fewer support cables 80 could be provided. Moreover, a wire mesh (not illustrated) could be provided, in an exemplary embodiment, either to supplement support cables 80 or to replace support cables 80. To further protect the linear array of modules 40 and the electrical leads 70 from wear and, in an exemplary embodiment, to provide weather and moisture resistance, an over-molding 90 is provided. Over-molding 90 could be any number of rubber or polymeric materials. In an exemplary embodiment, the linear array of modules 40 of tracking insert 10 is covered in rubber to make it water resistant and to resist abrasion from use.

It will be recognized and understood by those skilled in the art that pet owners often view a pet's collar as not merely a purely utilitarian device, but also a fashion accessory for the pet, with collars being provided in a wide range of sizes, materials, colors, and patterns. Accordingly, tracking insert 10 could be provided with a decorative cover (not illustrated) that could be secured to the tracking insert by any releasable means, including cooperating strips of hook and loop closure material commonly marketed under the trademark Velcro®. Additionally, the tracking insert 10 could be sold together with a collar 15 in coordinating colors.

The battery module 50 could be defined by a permanently mounted rechargeable battery or could be defined by interchangeable and removable battery modules adapted for external charging such that a user could exchange the battery and continue to use the device with a spare battery while the removed battery module is being charged externally. Further, in an exemplary embodiment illustrated in FIGS. 1 and 2A, charging could be accomplished by utilizing a charging port 48 into which a charging cable is plugged. Those skilled in the art will appreciate that charging port 48 could be any of numerous formats, including without limitation, USB, mini-USB, micro-USB, USB-C, or any format that may be introduced at a later time. In a further exemplary embodiment, illustrated in FIG. 2B, electrical charging could be accomplished by providing a plurality of electrical contacts 95 on one or both of the prongs of male portion 30' of collar connector 20. In this exemplary embodiment, a charging block (not illustrated) having a port adapted to receive male portion 30' such that during charging, male portion 30' of the collar connector 20 would be plugged into the charger (not illustrated). It will be appreciated by those skilled in the art that while the illustrated embodiment shows various connectors for recharging an internal battery, in a further exemplary embodiment, Further, while an exemplary embodiment has been described and illustrated as being used in conjunction with a pet collar, it is envisioned that the tracking insert could be readily adapted for use to track other pets, livestock, birds, children, adults. Additionally, the tracking insert of the present invention could also be used to track other types of assets. For instance, the tracking insert 10 could be adapted to be received on or within a beer keg for purposes of inventory tracking.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A tracking insert for tracking a location of a selected item, said tracking insert comprising
   a linear band defined by a plurality of modules, said modules being in electrical communication with one another, wherein at least one of said modules is a power source and wherein said linear band further includes a module for detecting the three-dimensional position of the tracking insert;
   a connector for securing said tracking insert to a selected object;
   electrical circuitry for charging said power source, wherein said electrical circuitry is in electrical communication with a charging port disposed on said tracking insert, wherein said electrical circuitry for charging said power source is in electrical communication with electrical contacts carried by a portion of said connector on said tracking insert;
   reinforcing means for securing said plurality of modules to each other in linear fashion; and
   a wear resistant cover for said linear band.

2. The tracking insert of claim 1 wherein said selected object is a pet collar having a collar connector, and further wherein said connector for securing said tracking insert to a selected object is adapted to be received by said connector of said pet collar.

3. The tracking insert of claim 2 wherein said pet collar has a connector selected from a group consisting of a side release buckle and a frame-and-prong buckle.

4. The tracking insert of claim 1 wherein said power source is defined by a removable battery.

5. The tracking insert of claim 4 wherein said removable battery is a rechargeable battery.

6. The tracking insert of claim 1 wherein said selected object is a pet collar and said means for securing said tracking insert to said tracking insert is a connector adapted to be releasably received by a collar connector on said selected object.

7. The tracking insert of claim 1 wherein said connector for securing said tracking insert to said selected object is defined by at least a pair of clip members carried by said tracking insert and adapted to secure said tracking insert to said selected object.

8. The tracking insert of claim 1 wherein said plurality of modules includes at least electronic circuitry selected from a group consisting of a GPS receiver, a radio module for radio based tracking devices, and a transceiver for communicating with a mobile device.

9. The tracking insert of claim 8 wherein said transceiver for communicating with a mobile device consists of a communication protocol selected from a group consisting of a W-Fi radio, Bluetooth radio, and a transceiver for a mobile cell phone protocol.

10. A tracking insert for tracking the location of a selected item, said tracking insert comprising
    a linear band defined by a plurality of modules, said modules being in electrical communication with one another, wherein at least one of said modules is a rechargeable power source and wherein said linear band further includes a module for detecting the three-dimensional position of the tracking insert;

a connector for securing said tracking insert to a selected object;

electrical circuitry for charging said rechargeable power source, wherein said electrical circuitry is in electrical communication with a charging port disposed on said tracking insert, wherein said electrical circuitry for charging said rechargeable power source is in electrical communication with electrical contacts carried by a portion of said connector on said tracking insert;

reinforcing means for securing said plurality of modules to each other in linear fashion; and a wear resistant cover for said linear band.

11. The tracking insert of claim 10 wherein said selected object is a pet collar having a collar connector, and further wherein said connector for securing said tracking insert to said selected object is adapted to be received by said connector of said pet collar.

12. The tracking insert of claim 11 wherein said connector for securing said tracking insert to said pet collar is defined by at least a pair of clip members carried by said tracking insert and adapted to secure said tracking insert to said pet collar.

13. The tracking insert of claim 10 wherein said selected object is a pet collar and said connector for securing said tracking insert to said tracking insert is adapted to be releasably received by a collar connector on a pet collar.

14. The tracking insert of claim 13 wherein said connector is selected from a group consisting of a side release buckle and a frame-and-prong buckle.

15. A tracking insert for tracking the location of a selected item, said tracking insert comprising a linear band defined by a plurality of modules, said modules being in electrical communication with one another, wherein at least one of said modules is a rechargeable power source and wherein said linear band further includes a module for detecting the three-dimensional position of the tracking insert;

a connector for securing said tracking insert to a pet collar, said pet collar having a connector selected from a group consisting of a side release buckle and a frame-and-prong buckle;

electrical circuitry for charging said rechargeable power source, wherein said electrical circuitry is in electrical communication with a charging port disposed on said tracking insert; wherein said electrical circuitry for charging said rechargeable power source is in electrical communication with electrical contacts carried by a portion of said collar connector on said tracking insert;

reinforcing means for securing said plurality of modules to each other in linear fashion; and a wear resistant cover for said linear band.

16. The tracking insert of claim 15 wherein said connector for securing said tracking insert to said collar is defined by at least a pair of clip members carried by said tracking insert and adapted to secure said tracking insert to said pet collar.

* * * * *